US005613063A

United States Patent [19]
Eustace et al.

[11] Patent Number: 5,613,063
[45] Date of Patent: Mar. 18, 1997

[54] METHOD AND APPARATUS FOR CHECKING VALIDITY OF MEMORY OPERATIONS

[75] Inventors: Robert A. Eustace; Louis Monier, both of Redwood City, Calif.

[73] Assignee: Digital Equipment Corporation, Maynard, Mass.

[21] Appl. No.: 270,061

[22] Filed: Jul. 1, 1994

[51] Int. Cl.$^6$ .................................................. G06F 11/30
[52] U.S. Cl. ...................................................... 395/183.14
[58] Field of Search ............................... 395/183.14, 700, 395/403, 471, 472, 473; 364/200, 519, 474.16, 474.19, 551.01, 267.4, 264, 264.5, 264.7, 265, 550, 580, 921.8, 943.9, 946; 371/51.1

[56] References Cited

U.S. PATENT DOCUMENTS

| | | | |
|---|---|---|---|
| 4,104,718 | 8/1978 | Poublan et al. | 364/200 |
| 4,104,721 | 8/1978 | Willy et al. | 364/200 |
| 4,276,594 | 6/1981 | Morley | 364/200 |
| 4,476,522 | 10/1984 | Bushaw et al. | 364/200 |
| 4,533,997 | 8/1985 | Furgerson | 364/200 |
| 4,545,016 | 10/1985 | Berger | 364/200 |
| 4,775,932 | 10/1988 | Oxley | 364/200 |
| 4,802,165 | 1/1989 | Ream | 371/19 |
| 4,811,347 | 3/1989 | Bolt | 371/51 |
| 4,825,360 | 4/1989 | Knight | 364/200 |
| 4,942,541 | 7/1990 | Hoel et al. | 364/519 |
| 4,953,084 | 8/1990 | Meloy et al. | 395/700 |
| 4,992,935 | 2/1991 | Comerford et al. | 364/200 |
| 5,029,078 | 7/1991 | Iwai | 395/600 |
| 5,132,972 | 7/1992 | Hansen | 371/19 |
| 5,193,180 | 3/1993 | Hastings | 395/575 |
| 5,274,811 | 12/1993 | Borg et al. | 395/700 |
| 5,335,344 | 8/1994 | Hastings | 395/575 |

FOREIGN PATENT DOCUMENTS

| | | |
|---|---|---|
| 0496494 | 7/1992 | European Pat. Off. |
| WO93/00633 | 1/1993 | WIPO |

OTHER PUBLICATIONS

Chow et al., "Engineering a Risc Compiler System", MIPS Computer Systems, pp. 132–137.
Austin, et al, "Efficient Detection of All Pointer and Array Access Errors," Computer Sciences Department, University of Wisconsin–Madison, Dec. 1, 1993, pp. 1–29.
Larus, et al, "Rewriting Executable Files to Measure Program Behavior," Computer Science Department, University of Wisconsin–Madison, Mar. 25, 1992, pp. 1–17.
Calliss, et al, "Dynamic Data Flow Analysis of C Programs," Proceedings of the Twenty–First Annual Hawaii International Conference on System Sciences, vol. II, IEEE, Jan. 5–8, 1988, pp. 514–523.

(List continued on next page.)

*Primary Examiner*—Robert W. Beausoliel, Jr.
*Assistant Examiner*—Stephen C. Elmore
*Attorney, Agent, or Firm*—Arthur W. Fisher; Ronald C. Hudgens; Krishnendu Gupta

[57] ABSTRACT

A memory monitoring system equips a computer program for monitoring its own memory accesses. The system employs special values, called "VALUEA" and "VALUEB," stored in the memory locations and a table of write tags, each preferably a single-bit flag corresponding to a different one of the memory's locations. If the write tag is not set for a particular memory location, VALUEA within that location indicates that it is unallocated, and VALUEB indicates that it is allocated and not initialized. The write tags can be set to indicate that the corresponding memory location contains written data. The program so equipped can monitor each memory access, including, e.g., allocation, write, read, and memory freeing operations, using the combination of the location contents and the write tag table to determine valid memory operations and to signal memory access violations. Counters can be provided to track the number of valid accesses of particular types and/or of valid accesses to particular locations.

15 Claims, 4 Drawing Sheets

OTHER PUBLICATIONS

Murray Egan, "Achieving Supercomputer Performance in a Lw Pain Environment," COMPCON, Spring 1990, Mar. 2, 1990, IEEE, pp. 205–207.

"Saber–C Reference," Saber Software, Inc., Cambridge, Massachusetts 20138.

Graham, et al, "Practical Data Breakpoints: Design and Implementation," Computer Science Division, University of California–Berkeley, Berkeley, California, Jun. 1993, pp. 1–13.

Wahbe, Robert, et al, "Low Latency RPC Via Software–Enforced Protection Domains," Computer Science Division, 571 Evans Hall, University of California–Berkeley, Berkeley, California 94720, 1993 (C00595).

Wahbe, Robert, "Efficient Data Breakpoints," Computer Science Division, 571 Evans Hall, University of California–Berkeley, Berkeley, California 94720, ACM 1992 (C0001), pp. 200–209.

Wall, David, "Systems For Late Code Modification", Western Research Laboratory, Palo Alto, California, May 1992 (C00093).

Wall, David, "Post–Compiler Transformation," Western Research Laboratory, Palo Alto, California, May 29, 1992 (C00011).

Hastings, et al, "Purify: Fast Detection of Memory Leaks and Access Errors," Proceedings of the Winter USENIX Conference, Jan. 1992, pp. 125–136.

"The Safe C Runtime Analyzer", Product Description and Manual Pages, Blossom/Catalytix, Cambridge, Massachusetts, prior to Feb. 1991.

Feuer, "si–An Interpreter for the C Language," USENIX Conference Proceedings, Summer 1985, pp. 47–55.

Ferrari, "Computer Systems Performance Evaluation," Englewood Cliffs, New Jersey, 1978, pp. 44–56.

Evans, et al, "DEBUG–An Extension to Current Online Debugging Techniques," Communications of the ACM, vol. 8, No. 5, May 1965, pp. 321–326.

Smith, "Tracing With Pixie," Standford, California, pixie UNIX man pages, pp. 1–2.

May, "MIMIC: A Fast Sysstem/370 Simulator," St. Paul, Minnesota, ACM SIGPLAN Notices, vol. 22, No. 7, 1987, pp. 1–13.

Boothe, "Fast accurate Simulation of Large Shared Memory Multiprocessors," University of California–Berkeley, Berkeley, California, EECS Report No. UCB/CDS 92/682, Apr. 1992.

Ward, "Wierd C BUggs," Computer Language, Apr. 1988, pp. 63–66.

Merilatt, "C Dynamic Memory Use," Dr. Dobbs' Journal, Aug. 1989, pp. 62, 64, 66–67, 125.

Anderson, "C Customized Memory Allocators,", Dr. Dobb's C Sourcebook, Winter 1898/90, pp. 62–66, 94.

Kempton, et al, "Run–Time Detection Of Undefined Variables Considered Essential," Software–Practice and Experience, vol. 20(4), Apr. 1990, pp. 391–402.

Johnson, "An Annotated Software Debugging Bibliography," Hewlett–Packard CSL 82–4, Mar. 1992, Palo Alto, California.

Fox, "Dynamic Memory Management in C," BYTE, Jun. 1988, pp. 313–314, 316, 318.

Heller, "Just Add Water," BYTE, Jun. 1990, p. 188.

Pearson, "Array Bounds Checking With Turbo C," Dr. Dobb's Journal, May 1991, pp. 72–74, 78–82, 104.

Thompson, "Error Checking, Tracing, and Dumping In An ALGOL 68 Checkout Compiler," SIGPLAN Notices, Jul. 1977, pp. 106–111.

Steffen, "Adding Run–Time Checking To The Poartable C Compiler," Software–Practice and Experience, vol. 22(4), Apr. 1992, pp. 305–316.

Welsh, "Economic Range Checks In Pascal," Software–Practice and Experience, vol. 8, 1978, pp. 85–97.

Zelkowitz, et al, "Error Checking With Pointer Variables," Proceedings of the ACM 1976 National Conference, 1976, pp. 391–395.

Delisle, et al, "Viewing a Programming Environment As A Single Tool," ACM SIGPLAN Notices, vol. 19(5), 1984, pp. 49–56.

Ross, "Integral C—A Practical Environment for C Programming," ACM SIGPLAN Notices, vol. 22(1), 1986, pp. 42–48.

Winner, "Unassigned Objects," ACM Transactions on Programming Languages and Systems, vol. 6, No. 4, Oct. 1984, pp. 449–467.

Chase, et al, "Selective Interpretation as a Technique For Debugging Computationally Intensive Programs," ACM SIGPLAN Notices, vol. 22(7), 1987, pp. 113–124.

Grossman, "Debugging With The 80386," Dr. Dibb's Journal, Feb. 1988, pp. 18, 20, 24, 26, 28.

Sato, et al, "Run–Time Checking in LISP By Integrating Memory Addressing And Range Checking," ACM Publication No. 0884–7495/89/000/0290, 1989, pp. 290–297.

Stucki, "A Prototype Automatic Program Testing Tool," AFIPS Fall Joint Computer Conference, 1972, pp. 829–836.

Stucki, et al, "New Assertion Concepts For Self–Metric Software Validation," SIGPLAN Notices, vol. 10(6), 1975, pp. 59–65.

Goldberg, "Reducing Overhead in Counter–Based Execution Profiling," Stanford Technical Report No. CSL–TR–91–495.

Mahmood, et al, "Concurrent Error Detection Using Watchdog Processors—A Survey," IEEE Transactions on Computers, vol. 37, No. 2, Feb. 1988, pp. 160–174.

Feustel, "On The Advantages Of Tagged Architecture," IEEE Transactions on Computers, vol. C–22, No. 7, Jul. 1973, pp. 664–656.

Deutsch, et al, "A Flexible Measurement Tool For Software Systems," Proceesings of IFIP Congress 1971, pp. TA–3–7 to TA–3–12.

Osterweil, L.J., et al, "Dave—A Validation Error Detection and Documentation System For Fortran Programs," Software–Practice and Experience, vol. 6, No. 4, Oct.–Dec. 1976, pp. 473–486.

Huang, J.C., "Detection of Data Flow Anomaly Through Program Instrumentation," IEEE Transactions on Software Engineering, vol. SE–5, No. 3, May 1979, pp. 226–236.

Wilson, C., et al, "OMEGA—A Data Flow Analysis KTool For The C Programming Language," IEEE Transactions on Software Engineering, vol. SE–11, No. 9, Sep. 1985, pp. 832–838.

Huang, J.C., "Program Instrumentation and Software Testing," Computer, vol. 11, Apr. 1978, pp. 25–32.

Srivastava, A., Wall, David W., "A Practical System for Intermodule Code Optimization at Link–Time", Dec. 1992.

Chow, et al, "Practical Data Breakpoints: Design and Implementation," Computer Science Division, University of California–Berkeley, Jun. 1993, pp. 1–13.

Borg, Anita, et al, "Long Address Traces From RISC Machines: Generation and Analysis," Western Research Laboratory, Palo Alto, California, Sep. 1989.

Goldberg, Aaron, et al, "MTOOL: A Method For Detecting Memory Bottlenecks," Western Research Laboratory, Palo Alto, California, Dec. 1990.

McFarling, Scott, "Program Optimization For Instruction Caches," Computer Systems Laboratory, Stanford University, Association for Computing Machinery, 1989.

MIPS Computer Systems, Inc., "RISCompiler and C Programmer's Guide," Chapter 4, Sunnyvale, California, 1989.

Wall, David, "Global Register Allocation at Link Time," Western Research Laboratory, Palo Alto, California, Sep. 1986.

Wall, David, et al, "The Mahler Experience: Using An Intermediate Language As The Machine Description," Western Research Laboratory, Palo Alto, California, Aug. 18, 1987.

Wall, David, "Link–Time Code Modification," Western Research Laboratory, Palo Alto, California, Sep. 1989.

Wall, David, "Register Windows vs. Register Allocation," Western Research Laboratory, Palo Alto, California, Dec. 1987.

Kaufer, Stephen, et al, "Saber C, An Interpreter–Based Programming Environment For The C Language," Summer USENIX 1988, San Francisco, Jun. 20–24, pp. 161–171.

Kessler, "Fast Breakpoint: Design and Implementation," Proceedings of the ACM SIGPLAN 1990, White Planes, New York, Jun. 20–22, 1990, pp. 78–84.

Johnson, "Postloading For Fun And Profit," USENIX, Winter 1990, pp. 325–330.

Bishop, "Profiling Under UNIX by Patching," Software Practice And Experience, vol. 17, No. 10, Oct. 1987, pp. 729–739.

Mellor–Crummey, et al, "A Software Instruction Counter," SIGPLAN Notices, vol. 24, Special Issue May 1989, pp. 78–86.

Fischer, et al, "The Implementation of Tun Time Diagnostics in Pascal," IEEE Transactions on Software Engineering, vol. SE–6, No. 4, Jul. 1980, pp. 313–319.

Horning, James, "What The Compiler Should Tell The User" Lecture Notes In Computer Science, Chapter 5–D., Springer–Verlag, 1974, pp. 525–548.

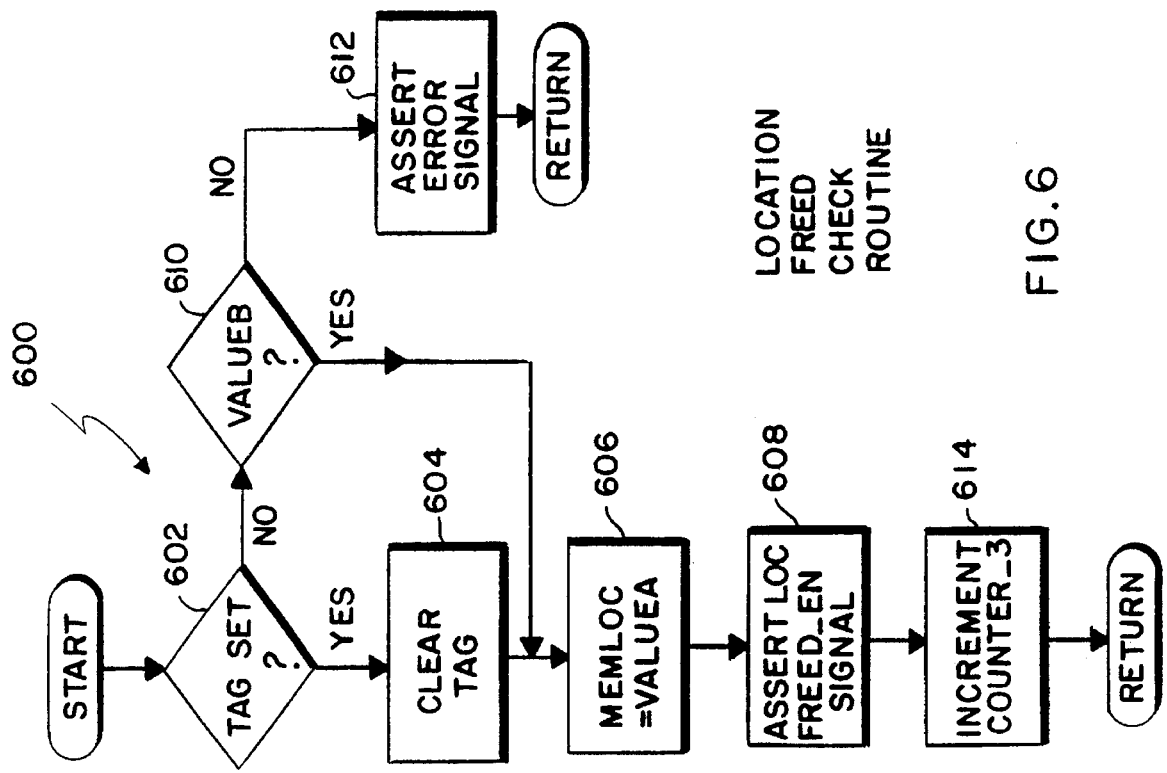
FIG. 6 LOCATION FREED CHECK ROUTINE
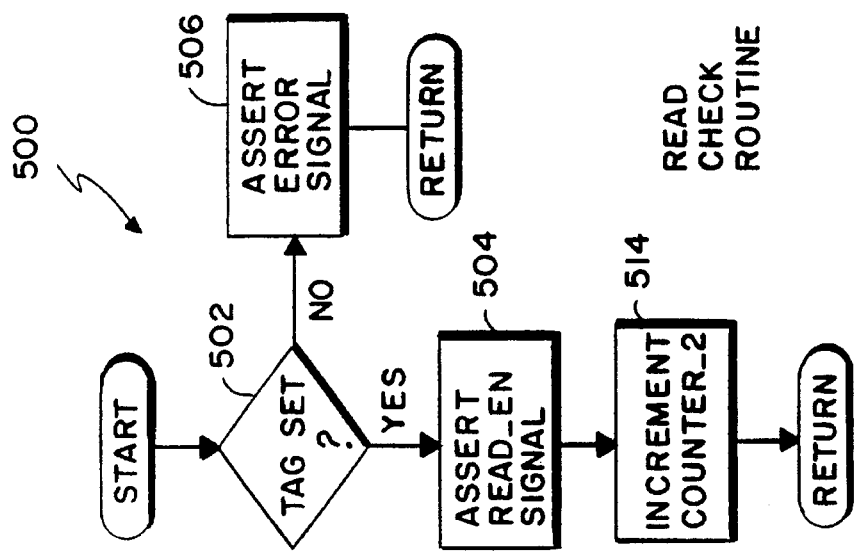
FIG. 5 READ CHECK ROUTINE

METHOD AND APPARATUS FOR CHECKING VALIDITY OF MEMORY OPERATIONS

FIELD OF THE INVENTION

This invention relates generally to computer systems, and more particularly to techniques for monitoring memory operations to assure that they are valid. The invention finds particular utility for purposes of computer program debugging, i.e., the process of identifying and signalling errors in programs, including memory access violations, and for purposes of memory optimization.

BACKGROUND OF THE INVENTION

A computer memory system (or memory, for short) comprises a plurality of memory locations for the storage and retrieval of data. A memory location is the smallest unit of memory that can be individually accessed, using a corresponding address for identification that is unique within the system.

Basic and well-known memory operations include allocating, freeing, reading, writing, and initializing memory locations. Many programs allocate and free memory locations, and most all programs read data from and write data to memory locations.

Many memory operations pertain generally to the process of allocating memory. "Allocation" is the process of making a set of memory locations available to a particular program or procedure. When performed during execution of the program, the operation is called "dynamic allocation." Not all memory areas are typically allocated dynamically; some can be statically allocated with pre-initialization or without initialization (e.g., variables and arrays of fixed size needed during the entire execution of a program); and some (e.g., stack) can be allocated and de-allocated automatically, without explicit request from the program, as procedures are called. "Freeing" is the process of de-allocating locations that were previously allocated, thus permitting them to be allocated for other purposes.

Other types of memory operations pertain to accessing the contents of the memory locations. "Writing" is the process of storing data in memory locations, and "reading" is the process of retrieving data from memory locations. "Initializing" is the process of setting the contents of memory locations to an initial, pre-determined value.

Only a few sequences of these basic memory operations are "valid," i.e., are not regarded as errors or violations. Memory access violations include, for example, allocation violations, read violations, uninitialized memory reads, write violations, and memory freeing errors. To enable an understanding of the invention, these terms can be defined as follows:

An "allocation violation" occurs in the unlikely event that a system attempts to allocate a portion of memory that has been allocated (and not freed) previously.

A "read violation" occurs when a program attempts to read from a memory location that is not allocated for use by that program.

An "uninitialized memory read" occurs when a program attempts to read from a memory location before it is written.

A "write violation" occurs when a program attempts to write to a memory location that is not allocated for use by that program.

A "memory freeing error" occurs, e.g., when a program attempts to free a memory location that is not currently allocated for use by the program.

On the occurrence of any of these violations, the program may obtain incorrect data, i.e., whatever data happens to be stored at the accessed memory location. Consequently, each of these violations can result in faulty program execution, incorrect program results, or complete program failure (often called "system crash").

A programmer can employ known software-based tools for enabling monitoring of memory accesses during runtime of a program to assure validity of memory operations. Use of such tools can be particularly important during debugging of programs written in advanced programming languages such as C/C++, whose programmer-manipulatable pointers can make it difficult to track down memory-access violations.

The software tools available to a programmer include conventional instrumenting programs that can equip a program under development for self-monitoring of memory accesses. The instrumenting program can modify the program code, e.g., at link time, for invoking a routine, e.g., a memory monitoring routine, upon each preselected memory access during run-time of the program.

See, for example, U.S. Pat. No. 5,193,180 (whose disclosure is incorporated herein by reference). See, also, Amitabh Srivastava and Dave W. Wall, "A Practical System for Intermodule Code Optimization at Link-Time," *Journal of Programming Languages*, March, 1993, (and the same article as published by Digital Equipment Corporation, WRL Research Report 92/6, December 1992), which describes code modification using an intermediate, symbolic language.

After instrumenting, the program under development can monitor its own memory accesses. This is achieved conventionally using a memory status table for maintaining information about the status of memory locations. Typically, the table is stored separately from the memory locations normally available for access by the program.

For example, U.S. Pat. No. 5,193,180 describes a technique by which an executable program can monitor its own memory accesses using a dedicated table that maintains information about three memory states: allocated-and-initialized, allocated-and-uninitialized, and unallocated. According to that patent, the allocated-and-initialized state corresponds to a memory location having been allocated to the program, and initialized by having valid data for the program written thereto. The allocated-and-uninitialized state corresponds to a memory location having been allocated to the program but not initialized. The unallocated state corresponds to a memory location having not been allocated to the program. Using such a table, the memory monitoring routine can signal an error if a memory location having unallocated status is accessed for a write-type operation, or if a memory location having either an unallocated status or an allocated-and-uninitialized status is accessed for a read-type operation. Unfortunately, the technique described in that patent uses a significant amount of memory overhead for that table, and consumes a significant amount of processing time in checking for only read type, uninitialized-memory-read type, and write type violations.

Other, conventional, memory monitoring techniques identify only a single type of violation, e.g., an uninitialized memory read. Examples of such techniques are described in James J. Horning, "What the Compiler Should Tell the User," *Compiler Construction, An Advanced Course*, Springer-Verlag, 1974, pages 525–548. A first example of such a technique described in the Horning reference associates, during compiling, an extra flag bit with each variable location, indicating whether the variable contains a valid value. (A "variable location" is a memory location whose contents define a variable used in a program.) That technique can then test that value upon each memory reference during run-time. A described alternative technique uses a single value (e.g., the largest negative number) representing each uninitialized variable, which is stored in the variable location. Upon each memory reference to that location, its contents can be tested to determine whether the associated memory location remains uninitialized.

It would be desirable to provide a memory access monitoring technique that can check for a greater range of possible access violations, and can reduce significantly the memory overhead requirements associated with error signalling.

SUMMARY OF THE INVENTION

The invention resides in a memory monitoring system for equipping a computer program for monitoring its own memory accesses which employs both special values, called "VALUEA" and "VALUEB," stored as contents of the memory locations themselves and a table of write tags. The write tags, each preferably a single-bit flag, can be set to indicate that a corresponding memory location contains written data.

In practice, (i) when the write tag for a given memory location is not set, and the contents of the location are VALUEA, the location is unallocated; (ii) when the write tag is not set and the contents are VALUEB, the location is allocated and not initialized, and (iii) when the write tag is set, the memory location has been previously written.

The program so equipped can monitor each preselected memory access, including allocation, write, read, and memory freeing operations, using the combination of the location contents and the write tag table to determine valid memory operations or otherwise to signal memory access violations.

The preferred embodiment can thus provide a memory access monitoring technique that can check for a greater range than the prior art of possible access violations, while reducing significantly the memory overhead requirements associated with error signalling. The write tag table of the invention requires about half the memory space of the dedicated table required by the above-referenced patent.

Briefly, the preferred embodiment can perform the following steps in checking the validity of one or more of the following memory operations:

Allocation and Initialization

On start-up of the computer system, a memory checking ("Mem_Check") routine sets unallocated memory locations to VALUEA, sets allocated but uninitialized locations to VALUEB, and clears the corresponding write tags, e.g., to LOGIC LOW. For all initialized locations, the write tag is set, e.g., to LOGIC HIGH.

Upon a memory location being allocated, Mem_Check checks the setting of the corresponding write tag. If the corresponding write tag is set, and the contents of the memory location are VALUEA, Mem_Check changes the contents of the memory location to VALUEB to indicate the ensuing valid allocation. Otherwise, Mem_Check signals an error. For example, if the contents of the memory location are equal to VALUEB, and the write tag is not set, the memory has already been allocated (and not since freed); therefore, the attempt to allocate (or re-allocate) that location is in error, i.e., an allocation violation.

Write Operation

Before a memory location is written, Mem_Check checks the value of the corresponding write tag. If the write tag is not set, e.g., to LOGIC HIGH, and the memory location does not contain VALUEB (i.e., the memory location has not been allocated), MEM_Check signals an error. If the write tag is not set and contents of the memory location are VALUEB, Mem_Check sets the write tag to indicate the ensuing valid write operation.

Read Operation

Before a memory location is read, Mem_Check checks the corresponding write tag. If the write tag is not set, Mem_Check signals an error because that would mean that the location does not contain written data. In all other cases, Mem_Check permits the read operation to proceed.

Memory Freed

Before a memory location is freed, Mem_Check checks the corresponding write tag. If the write tag is set, Mem_Check both permits the memory location to be set to VALUEA to indicate that it is available for future allocation, and clears the write tag to indicate that the location has not been written. If the write tag is not set, and the value of the memory location is VALUEB, Mem_Check changes the contents of the memory location to VALUEA to indicate deallocation. In all other cases, Mem_Check signals an error.

BRIEF DESCRIPTION OF THE DRAWINGS

For a fuller understanding of the nature of the invention, reference should be had to the following detailed description taken in connection with the accompanying drawings, in which:

FIG. 5 is a block diagram of the memory read check routine of FIG. 2; and

FIG. 6 is a block diagram of the memory freed check routine of FIG. 2.

DETAILED DESCRIPTION OF PREFERRED EMBODIMENT a) The Computer System

Figure 1:
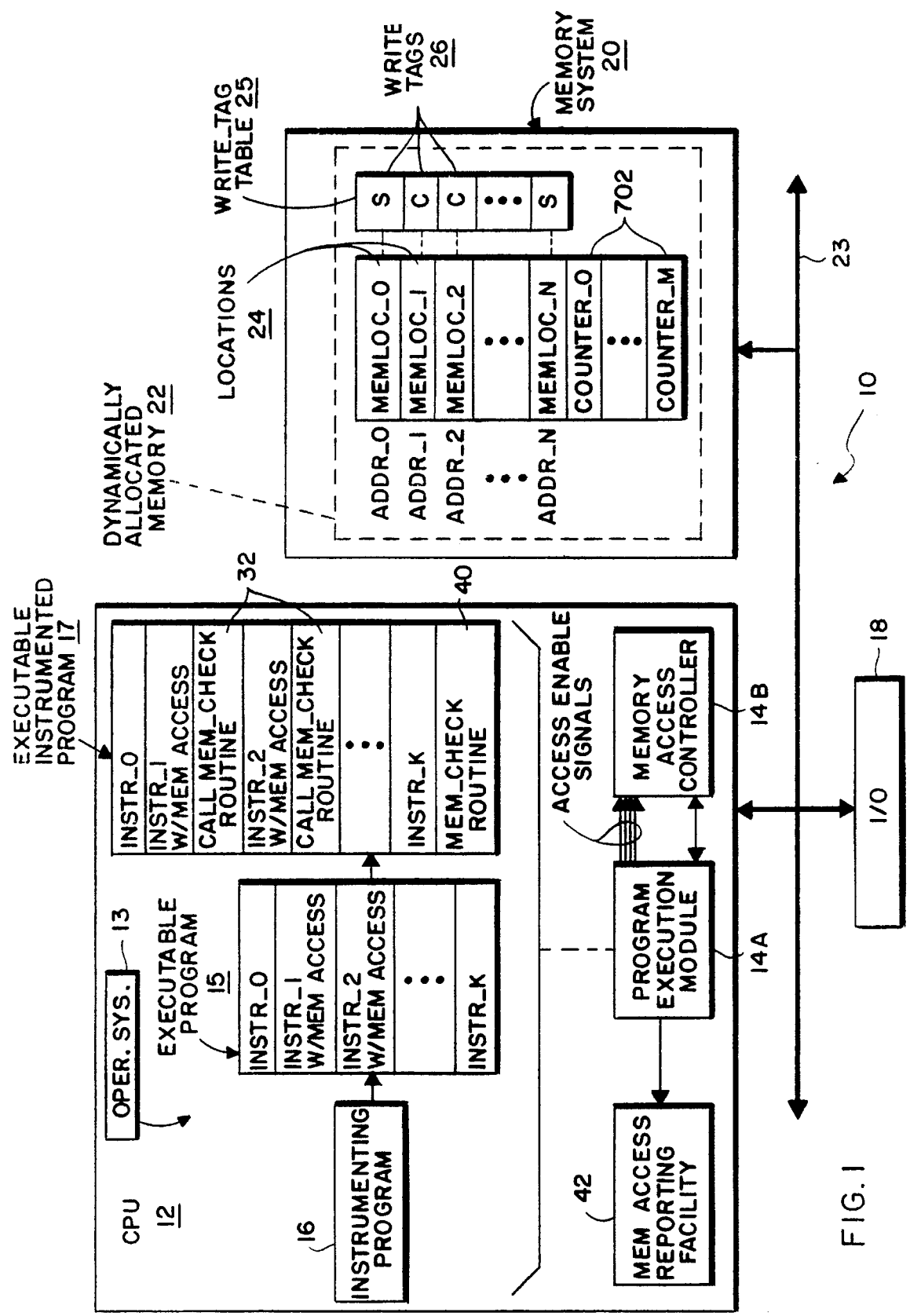
FIG. 1 is a block diagram of a computer system including a memory program equipped with a memory checking routine in accordance with a preferred embodiment of the invention.

FIG. 1 shows a computer system 10 in accordance with the invention. The computer system 10 has a conventional, general-purpose central processing system ("CPU") 12 and an operating system 13 for controlling operation of the system 10. The CPU 12 includes a program execution module 14A for executing a plurality of computer programs, e.g., programs 15–17.

The computer system 10 also has a memory system 20, having a portion 22 that can be dynamically allocated for use by the program 17. A memory access controller 14B of the CPU 12 controls accesses to the memory system 20.

In addition, the computer system 10 has an I/O subsystem 18, which includes, e.g., a display monitor (not shown) and a keyboard (not shown), and has a main bus 23, which interconnects the CPU 12, I/O subsystem 18, and memory system 20.

b. The Memory

The memory 20 includes a plurality of (e.g., "N+1", where "N" is a positive integer) memory locations 24, each identified by an address ADDR_0 through ADDR_N, and each having contents represented as MEMLOC_0 through MEMLOC_N.

The memory 20 also includes a write tag table 25, having a plurality write tags 26, preferably "N+1", the same number as there are memory locations 24 tracked by the invention. Each of the write tags 26 is associated with a different one of the memory locations 24. Preferably, each write tag 26 can be formed as a single bit, which the CPU 12 can set to a value "S", e.g., LOGIC HIGH, or cleared to a value "C", e.g., LOGIC LOW. The particular write tag values of "S" and "C" shown for the memory location addresses ADDR_0, . . . , ADDR_N in FIG. 1 are purely for purposes of illustration of the principles involved.

c. The Program Instrumenting Process

For enabling a program under development, e.g., program 15, to monitor its own memory accesses, the CPU 12 employs an instrumenting program 16 to equip the program 15 with memory monitoring functionality. This functionality allows the system 10 to debug the program 15 by identifying memory access violations, and/or to optimize the memory 22. For memory optimization, the invention can be practiced to analyze memory allocation and usage patterns, e.g., excessive memory allocation to the program 15, or pointers allocated but not used by the program 15.

More specifically, the program 15 is shown as including code specifying a sequence of instructions INSTR_0 through INSTR_K, where "K" is a positive integer. Some of the instructions, e.g., INSTR_1 and INSTR_2, specify memory accesses. The instrumenting program 16 modifies the code of the program 15 under development so as to generate an instrumented program 17. The instrumented program 17 has, for each instruction INSTR_1, INSTR_2 specifying a memory access, a "next" instruction 32 (i.e., an instruction executable immediately after the memory-access instruction) that specifies a call to a memory check ("Mem_Check") routine 40.

d. Mem_Check Routine

The Mem_Check routine 40 supervises accesses to the memory 20, maintains the write tag table 25, reads and writes preselected values into locations 24, analyzes the write tag table entries and the location entries to determine validity of memory accesses, and signals any access violations, e.g., by generating suitable error signals.

Consequently, as the program execution module 14A executes the instrumented program 17, the Mem_Check routine 40 may produce memory access violation signals. Responsive to these signals, a reporting facility 42 can report and otherwise provide information concerning memory access violations, e.g., to programmers and other users via the I/O subsystem 18. The program execution module 14A can also invoke fault or exception handling procedures in response to the memory access violation signals.

In some embodiments of the invention, it may be desirable for the Mem_Check routine 40 to produce also memory access enable signals in response to valid memory operations for explicitly enabling those operations under the direction of the memory access controller 14B.

The Mem_Check routine 40 essentially implements a memory access monitoring method 200 for checking validity of memory operations, as depicted in FIGS. 2–6.

e. Memory Access Monitoring Method

The memory access monitoring method 200 uses special values stored as contents MEMLOC_0, . . . MEMLOC_N of the locations 24 in conjunction with the write tags 26 to indicate valid allocation, and other valid memory operations, including write, read and memory freeing operations.

Figure 2:
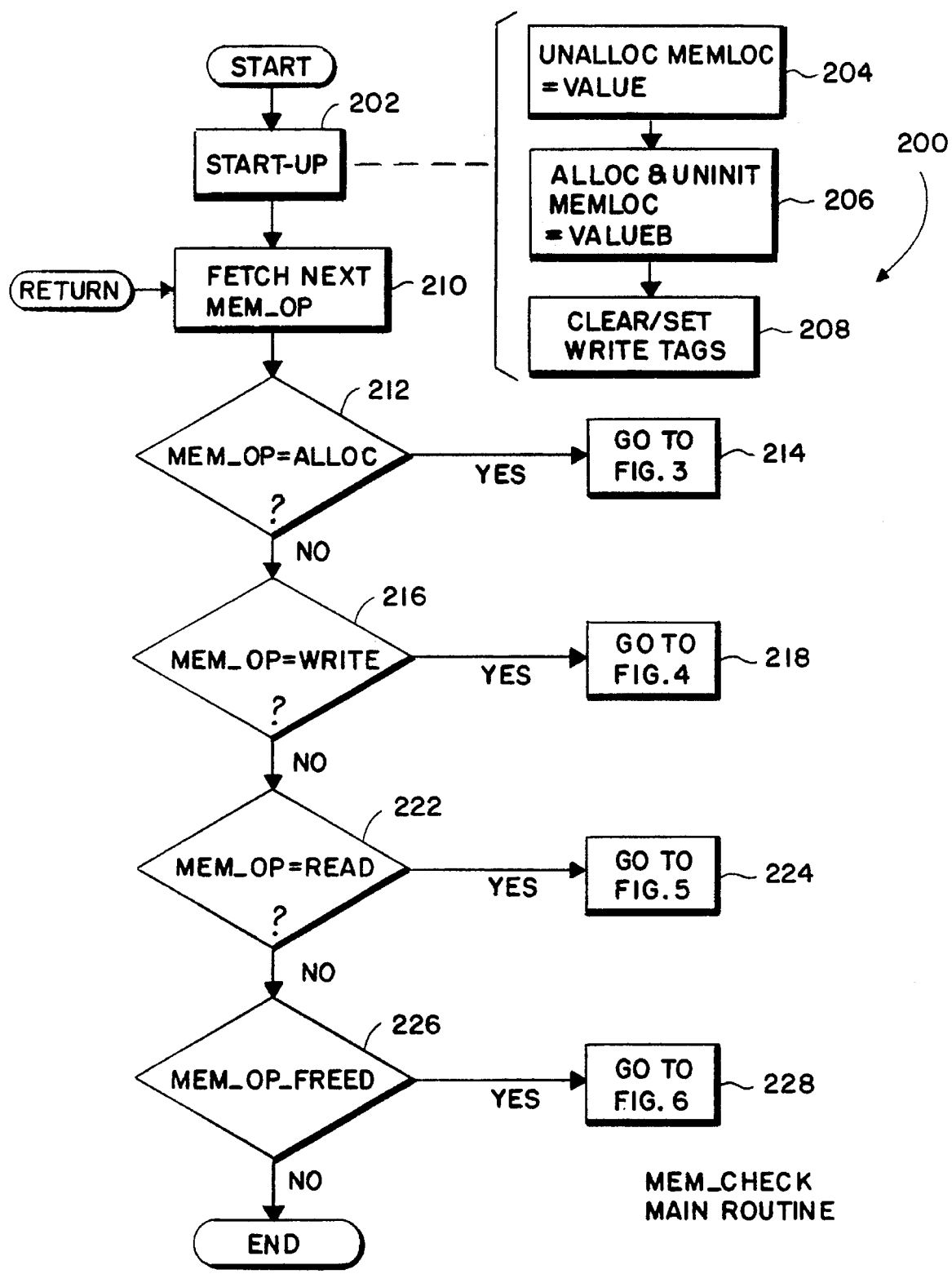
FIG. 2 is a block diagram of a memory access monitoring method implemented by the memory checking routine of FIG. 1.

More specifically, and with reference to FIG. 2, the memory access monitoring method 200, during start-up, in block 202, performs certain initial steps, as follows: setting all the contents MEMLOC_0, . . . , MEMLOC_N of unallocated memory locations 24 (FIG. 1) to a preselected first value, called "VALUEA," in block 204; setting allocated but uninitialized memory locations 24 (FIG. 1) to a preselected, second value, called "VALUEB," in block 206; and clearing write tags 26 (FIG. 1) corresponding to uninitialized locations and set write tags associated with initialized locations in block 208.

VALUEA and VALUEB can be any integer value, as long as they are not equal to one another. In a preferred implementation, VALUEA and VALUEB are preselected constants and do not change during program execution. Alternatively, VALUEA and VALUEB can be selected to represent system parameters, and need not remain constant in value for different memory accesses. Such system parameters can include, e.g., an identification of an individual processor (useful particularly in an embodiment of the invention where system 10 has multiple processors (not shown)) that allocated the corresponding memory location, the number of times that the memory location has been accessed, or a pointer into a call stack at a selected instance of time. In still other implementations of the invention, VALUEA and/or VALUEB can be values that are not preselected, but rather computed during program execution.

In block 210, the method 200 fetches a first or next instruction that specifies a memory operation ("Mem_OP"). Each "return" block in FIGS. 3–6 indicates that the method 200 returns to this block 210.

Figure 4:
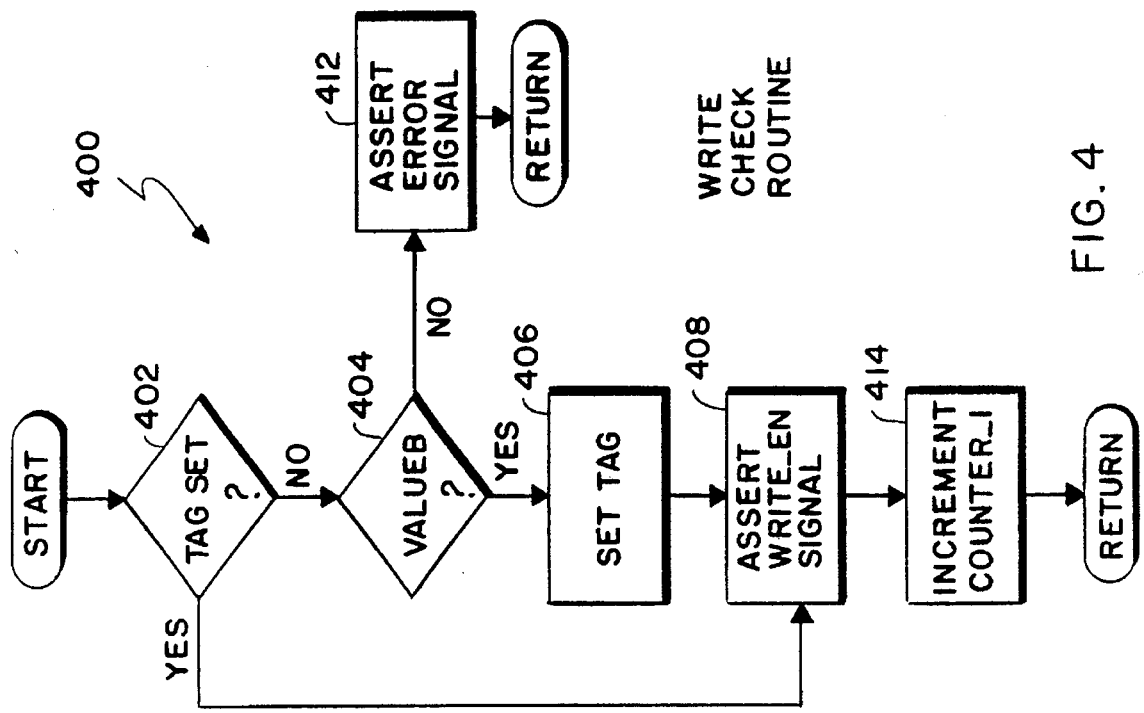
FIG. 4 is a block diagram of the memory write check routine of FIG. 2.
Figure 3:
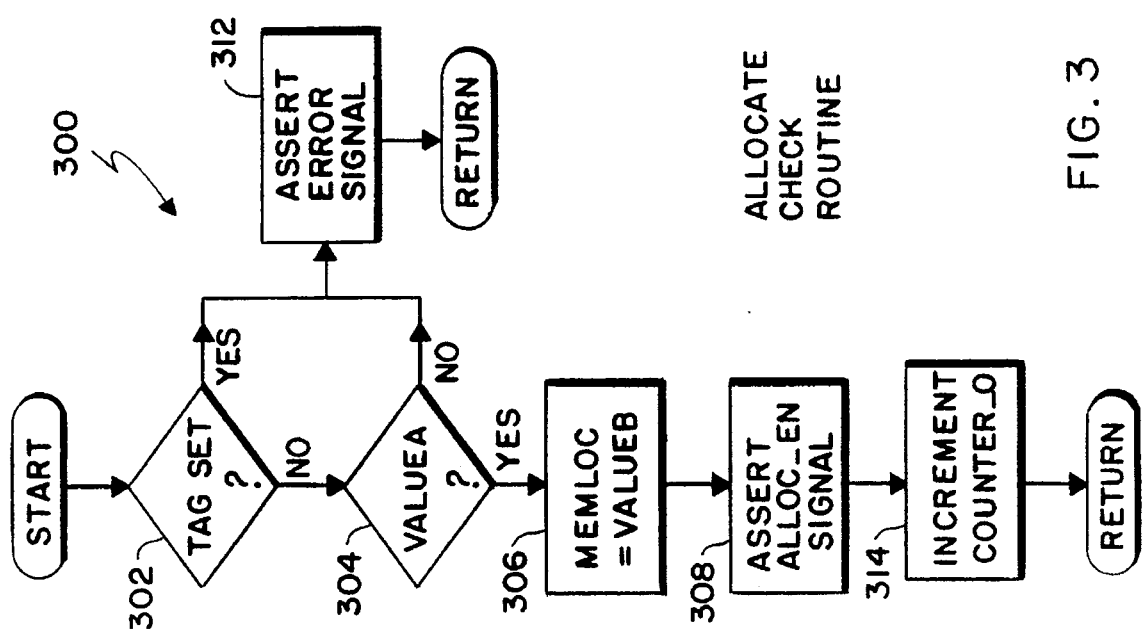
FIG. 3 is a block diagram of the allocation check routine of FIG. 2.

During run-time, the memory access monitoring method checks each instruction INSTR_1 and INSTR_2 (or a predetermined subset thereof) in the program 17 (FIG. 1) specifying a memory operation by performing the following steps:

(a) testing in block 212 whether the memory operation is an allocation, in which case the method 200 goes in block 214 to an allocation check routine 300 shown in FIG. 3;

(b) testing in block 216 whether the memory operation is a write, in which case the method 200 goes in block 218 to a write check routine 400 shown in FIG. 4;

(c) testing in block 222 whether the memory operation is a read, in which case the method 200 goes in block 224 to a read check routine 500 shown in FIG. 5; and (d) testing in block 226 whether the memory operation is a freeing operation, in which case the method 200 goes in block 228 to a memory freed check routine shown in FIG. 6.

Since the program 17 includes calls to Mem_Check 40 for only preselected types of memory accesses, e.g., only the types of memory operations listed in (a) through (d), above, the memory access monitoring method 200 must branch to one or another of the routines of FIGS. 3–6, as noted.

FIG. 3 shows the allocation check routine 300, which is invoked when the program instruction specifies that at least one of the memory locations 24 (FIG. 1) is to be allocated for use by the program 17 (FIG. 1). Where the memory operation that causes the instrumented program 17 to call Mem_Check 40 specifies more than one memory location, each specified location is dealt with in the same way. Accordingly, the discussion that follows need only describe, by way of illustration, access to a single memory location.

The allocation check routine 300 starts with a block 302, which tests whether the write tag 26 (FIG. 1), which corresponds to the memory location 24 (FIG. 1) to be allocated, is set, e.g., to value S.

If the write tag 26 (FIG. 1) is not set, block 304 tests whether the contents MEMLOC_0, . . . , or MEMLOC_N of the memory location 24 (FIG. 1) are equal to VALUEA. If the contents MEMLOC_0, . . . , or MEMLOC_N of the location 24 are equal to that value, block 306 changes that value to VALUEB to indicate a validly allocated location, and block 308 signals that the location 24 (FIG. 1) can be allocated by generating (and asserting to the memory access controller 14B (FIG. 1)) an allocation enable ("ALLOC_EN") signal.

On the other hand, if the tests of blocks 302 and 304 indicate that the write tag 26 (FIG. 1) is set or the contents MEMLOC_0, . . . , or MEMLOC_N of the memory location 24 (FIG. 1) are not equal to VALUEA, block 312 signals an error, i.e., an allocation error.

FIG. 4 shows the memory write check routine 400, which is invoked when the program instruction specifies that data is to be written into at least one of the memory locations 24 (FIG. 1). The memory write check routine 400 starts with a block 402, which tests whether the write tag 26 (FIG. 1), which corresponds to the memory location 24 (FIG. 1), is set.

If the write tag 26 (FIG. 1) is not set, block 404 tests whether the contents MEMLOC_0, . . . , or MEMLOC_N of the memory location 24 (FIG. 1) are equal to VALUEB. If the contents MEMLOC_0, . . . , or MEMLOC_N are equal to that value, block 406 sets the write tag 26 (FIG. 1) to indicate a validly written location, and block 408 signals that data can be written to the memory location 24 (FIG. 1) by generating (and asserting to the memory access controller 14B (FIG. 1)) a write enable ("WRITE_EN") signal.

If the test of block 402 indicates that the write tag 26 (FIG. 1) is set already, the routine 400 proceeds directly to the write enable signal block 408. If block 404 comes up negative, i.e., the contents MEMLOC_0, . . . , or MEMLOC_N of the location 24 are not equal to VALUEB, block 412 signals an error, i.e., a write error.

FIG. 5 shows the memory read check routine 500, which is invoked when the program instruction specifies that data is to be read from at least one of the memory locations 24 (FIG. 1).

The memory read check routine 500 starts with a block 502, which tests whether the write tag 26 (FIG. 1), which corresponds to the memory location 24 (FIG. 1), is set. If the write tag 26 (FIG. 1) is set, block 504 signals that data can be read from the memory location 24 (FIG. 1) by generating (and asserting to the memory access controller 14B (FIG. 1)) a read enable ("READ_EN") signal, and, if not set, block 506 signals an error, i.e., a read error.

FIG. 6 shows a memory freed check routine 600, which is invoked when the program instruction specifies that at least one memory location 24 (FIG. 1) previously allocated for use by the program 16 (FIG. 1) is to be de-allocated. The memory freed check routine 600 starts with a block 602, which tests whether the write tag 26 (FIG. 1), which corresponds to the memory location 24 (FIG. 1) that the program 16 (FIG. 1) seeks to free, is set.

If the write tag 26 (FIG. 1) is set, block 604 clears the write tag 26 (FIG. 1), block 606 sets the contents MEMLOC_0, . . . , or MEMLOC_N of the memory location 24 (FIG. 1) to VALUEA to indicate a validly allocated location, and block 608 signals that the memory location 24 (FIG. 1) can be freed by generating (and asserting to the memory access controller 14B (FIG. 1)) a location freed enable ("LOCFREED_EN") signal.

If the write tag 26 (FIG. 1) is not set, block 610 tests whether the contents MEMLOC_0, . . . , MEMLOC_N of the memory location 24 (FIG. 1) are equal to VALUEB. If the contents MEMLOC_0, . . . , or MEMLOC_N of the location 24 are equal to VALUEB, routine 600 proceeds with block 606 where the contents MEMLOC_0, . . . , or MEMLOC_N of the location 24 (FIG. 1) are set to VALUEA to indicate a validly initialized location, and if not equal to that VALUEB, block 612 signals an error, i.e., a memory freeing error.

f. Other Features and Embodiments

Many additional features and embodiments of the invention deserve attention.

(i) In some applications, it may be desirable to report statistical information about memory accesses, e.g., to aid in memory optimization. To that end, and as depicted in FIG. 1, the memory 20 can include data structures providing a plurality of counters 702 (e.g., Counter_0 through Counter_M, where "M" is a positive integer), each responsible for maintaining a count of the number of memory accesses falling within a preselected, corresponding operation type, e.g., allocate, write, read, etc.

Alternatively, or additionally, each of a plurality of sets of the counters 702 can be associated with a different memory location, and can be used to count valid accesses to the associated memory location. The count can be made cumulatively (i.e., regardless of the type of memory operation for which access is sought) or can be broken down by particular type of memory operation, e.g., read or write, with each assigned to a different counter.

Accordingly, as shown in FIGS. 3–6, each access routine 300–600 of the memory access monitoring method 200 further includes a block 314, 414, 514, and 614 for causing the CPU 12 to increment the corresponding counter COUNT_0 through COUNT_M, respectively, when the corresponding memory operation is determined to be valid.

While it is preferable to implement the counters 702 in this fashion, the counters can be implemented alternatively in the form of hardware registers (not shown). Either way, the counters 702 can be read and the statistic information therefrom provided to the memory access reporting facility 42 for inclusion in reports provided, e.g., to programmers and other users via the I/O subsystem 18.

(ii) In many applications, the invention will be implemented to signal for each and every one of the above-described memory operations, namely, allocation violations, read violations, uninitialized memory read errors write violations, and memory freeing errors. Such implementations can find particular utility in checking validity of operations to dynamically allocated memory locations. In other applications, for example, those with respect to accesses to statically allocated memory or to a stack, a subset of these violations can be checked, e.g., uninitialized memory reads.

(iii) As described heretofore, the FIG. 1 embodiment uses a different write tag 26 for each memory location 24.

The invention can also be practiced at a different level of granularity, e.g., by associating a different write tag with a memory block including one or more memory locations, and analyzing validity of preselected memory operations with respect to the memory blocks rather than to memory locations. Moreover, a set of the counters 702 can be used to track accesses to the memory blocks rather than to the individual memory locations.

While the invention has been described with reference to specific embodiments, this description is not meant to be construed in a limiting sense. Various modifications of the disclosed embodiments, as well as other embodiments of the invention, will be apparent to those skilled in the art upon reference to this description. For example, while it is contemplated that each block of the memory access monitoring method 200 depicted in FIGS. 2–6 can represent code of program 17 equipped for monitoring its own memory accesses, the illustrated blocks can also represent firmware or hardware for performing the same functions. Consequently, it is intended that the appended claims cover any such modifications or embodiments as fall within the spirit and scope of the invention.

What is claimed is:

1. A computer-implemented method for monitoring accesses by a computer program to a memory of a computer system for performing a plurality of operations including allocation operations, write operations and read operations; said method checking validity of each of a plurality of instructions of said computer program specifying at least one of said memory operations with respect to at least a specified one of a plurality of memory locations; said method comprising the steps of:

A) providing a plurality of write tags, each of the write tags corresponding to one of the memory locations;

B) initializing any of the memory locations that are uninitialized by performing the steps comprising (i) storing a preselected value, called "VALUEA," as contents in the uninitialized memory locations, and (ii) clearing the write tags corresponding to the uninitialized memory locations;

C) indicating allocation of the uninitialized memory locations by replacing the contents thereof with a preselected second value, called "VALUEB";

D) in association with each write operation, setting the corresponding write tag to a preselected write tag value; and E) in response to the values of the write tags and the contents of the memory locations, determining whether each said allocation operation, read operation and write operation is valid.

2. The method in accordance with claim 1, further including the step of signalling a memory access violation in response to any determination of an invalid operation.

3. The method in accordance with claim 1, wherein said VALUEA and VALUEB comprise system parameters.

4. The method in accordance with claim 1, further including the step of storing a count of each write operation determined to be valid, and a count of each read operation determined to be valid.

5. The method in accordance with claim 1, wherein said determining step includes the step of:

A) determining whether each said memory operation comprises an allocation operation, B) for each said allocation operation, identifying the write tag that corresponds to the memory location specified by the instruction specifying the allocation operation, and signaling an allocation error in response to either (i) the identified write tag having the preselected write tag value, or (ii) the identified write tag not having the preselected write tag value and the memory location not having VALUEA.

6. The method in accordance with claim 1, wherein said determining step includes the step of:

A) determining whether each said memory operation comprises a write operation,

B) for each said write operation, identifying the write tag that corresponds to the memory location specified by the instruction specifying the write operation, and signaling a write error in response to the identified write tag not having the preselected write tag value and the memory location not having VALUEB.

7. The method in accordance with claim 1, wherein said determining step includes the step of:

A) determining whether each said memory operation comprises a read operation,

B) for each said read operation, identifying the write tag that corresponds to the memory location specified by the instruction specifying the read operation, and signaling a read error in response to the identified write tag not having the preselected write tag value.

8. A computer-implemented method for monitoring accesses to a memory of a computer system; said method checking validity of each of a plurality of instructions in a computer program specifying a memory operation with respect to a specified memory location of a plurality of memory locations of said memory; each said memory operation comprising one of an allocation operation, write operation, read operation, and memory freeing operation; each said memory location having a corresponding write tag; said method comprising the steps of:

A) upon determining that the memory operation comprises an allocation operation, signalling an allocation error in response to either (i) the write tag corresponding to the specified memory location having a pre-selected first value; or (ii) the write tag not having the pre-selected first value and the specified memory location not having a preselected second value called VALUEA;

B) upon determining that the memory operation comprises a write operation, and responsive to the write tag corresponding to the specified memory location not having the pre-selected first value and the memory location not having a pre-selected third value, called VALUEB, signaling a write error;

C) upon determining that the memory operation comprises a read operation, and responsive to the write tag corresponding to the specified memory location not having the pre-selected first value, signaling a read error; and D) upon determining that the memory operation comprises a memory freeing operation, and responsive to the write tag corresponding to the specified memory location not having the pre-selected first value and the specified memory location not having VALUEB, signalling a memory freeing violation.

9. A computer-implemented method for monitoring accesses to a memory of a computer system; said method checking validity of each of a plurality of instructions in a computer program specifying a memory operation with respect to a specified memory location of a plurality of memory location of the memory; each said memory operation comprising one of an allocation operation, write operation, read operation, and memory freeing operation; each said memory location having a corresponding write tag; said method comprising the steps of:

A) upon determining that the memory operation comprises an allocation operation, performing the steps comprising:
  (i) responsive to the write tag corresponding to the specified memory location not having a preselected first value and the specified memory location having a preselected second value ("VALUEA"), storing a preselected third value ("VALUEB") in the specified memory location, and
  (ii) responsive to the write tag having the preselected first value, signalling an allocation error; and
  (iii) responsive to the write tag not having the preselected first value and the specified memory location not having VALUEA, signalling an allocation error;

B) upon determining that the memory operation comprises a write operation, performing the steps comprising:
  (i) responsive to the write tag corresponding to the specified memory location not having the preselected first value and the specified memory location having VALUEB, setting the write tag to the preselected first value, and
  (ii) responsive to the write tag corresponding to the specified memory location not having the preselected first value and the specified memory location not having VALUEB, signaling a write error;

C) upon determining that the memory operation comprises a read operation, and responsive to the write tag corresponding to the specified memory location not having the preselected first value, signaling a read error; and D) upon determining that the memory operation comprises a memory freeing operation, performing the steps comprising:
  (i) responsive to the write tag corresponding to the specified memory location having the preselected first value, setting the writing tag to a pre-selected fourth value, and storing VALUEA in the specified memory location,
  (ii) responsive to the write tag not having the preselected first value, and the specified memory location having VALUEB, storing VALUEA in the specified memory location, and
  (iii) responsive to the write tag not having the preselected first value and the specified memory location not having VALUEB, signalling a memory freeing violation.

10. A computer-implemented method for monitoring accesses to a memory of a computer system; said method checking validity of each of a plurality of instructions in a computer program specifying a memory operation with respect to a specified memory location of a plurality of memory location of the memory; each said memory operation comprising one of an allocation operation, write operation, read operation, and memory freeing operation; each said memory location having a corresponding write tag; said method comprising the following steps with respect to each said memory operation:

A) testing whether the memory operation comprises an allocation operation, in which the program seeks to have the specified memory location allocated for its own use, and, if an allocation operation, performing the steps comprising:
  (i) testing whether the write tag corresponding to the memory location specified by the operation is set;
  (ii) if the write tag is not set, testing whether the specified memory location stores a preselected first value, called "VALUEA"; and if the specified memory location stores VALUEA, storing a preselected, second value, called "VALUEB", in the specified memory location, and signaling that the specified memory location can be allocated; said VALUEA and VALUEB being different values; and
  (iii) if the write tag is set or the contents of the memory location does not store VALUEA, signaling an error;

B) testing whether the memory operation comprises a write operation in which the program seeks to write data to the specified memory location, and, if a write operation, performing the steps comprising:
  (i) testing whether the write tag corresponding to the memory location specified by the operation, is set;
  (ii) if the write tag is not set, testing whether the memory location has VALUEB;
  (iii) if the specified memory location has VALUEB, setting the write tag, and signaling that data can be written to the specified memory location;
  (iv) if the write tag is set, signaling that data can be written to the memory location; and
  (v) if the specified memory location does not store VALUEB, signaling an error;

C) testing whether the specified memory operation comprises a read operation in which the program seeks to read data from the specified memory location, and if a read operation, performing the steps comprising of:
  (i) testing whether the write tag corresponding to the specified memory location is set; and
  (ii) if the write tag is set, signaling that data can be read from the specified memory location, and, if the write tag is not set, signaling an error;

D) testing whether the specified memory operation comprises a valid memory freeing operation in which the program seeks to free the specified memory location which has been previously allocated for use by the program, said step comprising the steps of:
  (i) testing whether the write tag corresponding to the specified memory location is set;
  (ii) if the write tag is set, clearing the write tag, storing VALUEA in the specified memory location, and signalling that the specified memory location can be freed;
  (iii) if the write tag is not set, testing whether the contents of the specified memory location are equal to VALUEB; and
  (iv) if the contents of the specified memory location are equal to VALUEB, setting contents the specified memory location to VALUEA, and if the contents are not equal to VALUEB, signaling an error.

11. In a computer, an executable computer program capable of monitoring its own memory accesses to a plurality of locations of memory for performing allocation, read and write operations, said computer program comprising:

A) write status maintaining code for causing the computer to maintain a plurality of write tags, each of the write tags corresponding to one of the memory locations; wherein, in conjunction with the computer writing data to a specified location of the memory locations, the computer sets the corresponding write tag to a preselected first value to indicate the write operation with respect to the specified corresponding location;

B) initialization indicating code for causing the computer to indicate initialization of any uninitialized locations of the memory locations by storing a preselected value, called "VALUEA," as contents in the uninitialized memory locations, and clearing the write tags corresponding to the uninitialized memory locations;

C) allocation indicating code for causing the computer to indicate allocation of a set of the memory locations that have not been initialized and not subject to a subsequent write operation by storing a preselected second value, called "VALUEB," as contents in each of the memory locations of the set of memory locations; and E) memory monitoring code coupled with the write status maintaining code, initialization indicating code and the allocation indicating code for causing the computer, in response to the values of the corresponding write tags and the contents of the memory locations of the set of memory locations, to determine whether each said allocation operation, read operation and write operation is valid.

12. The executable computer program in accordance with claim 11, wherein said memory monitoring code includes A) allocation determining code for causing the computer to determine whether each said memory operation comprises an allocation operation, B) allocation analyzing code for causing the computer, for each said allocation operation, to identify a first write tag comprising the write tag that corresponds to the memory location specified by the allocation operation, and to signal an allocation error in response to either (i) the first write tag having the first value, or (ii) the first write tag not having the first value and the specified memory location not containing VALUEA.

13. The executable computer program in accordance with claim 10, wherein said memory monitoring code includes A) write operation determining code for causing the computer to determine whether each said memory operation comprises a write operation, D) write operation analyzing code for causing the computer, for each said write operation, to identify a second write tag comprising the write tag that corresponds to the memory location specified by the write operation, and to signal a write error in response to the second write tag not having the first value and the memory location not having VALUEB.

14. The executable computer program in accordance with claim 10 or 13, wherein said memory monitoring code includes A) read operation determining code for causing the computer to determine whether each said memory operation comprises a read operation, B) read operation analyzing code for causing the computer, for each said read operation, to identify a third write tag comprising the write tag that corresponds to the memory location specified by the read operation, and to signal a read error in response to the third write tag not having the first value.

15. The executable computer program in accordance with claim 10, wherein said memory monitoring code includes A) location freeing operation determining code for causing the computer to determine whether each said memory operation comprises a location freeing operation, in which the program seeks to free a memory location which has been previously allocated for use by the program, B) location freeing operation analyzing code for causing the computer, for each said location freeing operation, to identify a forth write tag comprising the write tag that corresponds to the memory location specified by the memory freeing operation, and to signal a memory freeing error in response to the forth write tag not having the first value and the contents of the memory location not being equal to VALUEB.

* * * * *